United States Patent [19]

Kozaki et al.

[11] Patent Number: 4,856,875
[45] Date of Patent: Aug. 15, 1989

[54] LIQUID-CRYSTAL DISPLAY DEVICES OF TWISTED NEMATIC TYPE

[75] Inventors: Shyuichi Kozaki, Nara; Yukiko Ichimura, Tenri; Yozo Narutako, Nara, all of Japan

[73] Assignee: Sharp Kabushiki Kaisha, Osaka, Japan

[21] Appl. No.: 139,025

[22] Filed: Dec. 29, 1987

[30] Foreign Application Priority Data

Dec. 29, 1986 [JP] Japan .................... 61-312753

[51] Int. Cl.$^4$ .................... G02F 1/13; C09K 19/34
[52] U.S. Cl. .................... 350/341; 252/299.61; 252/299.5; 252/299.01; 350/333; 350/346; 350/350 R
[58] Field of Search .................... 252/299.61, 299.01, 252/299.5; 350/350 R, 341, 346, 383

[56] References Cited

U.S. PATENT DOCUMENTS

| | | | |
|---|---|---|---|
| 4,579,425 | 4/1986 | Ishii et al. | 350/341 |
| 4,634,229 | 1/1987 | Amstutz et al. | 252/299.01 |
| 4,643,841 | 2/1987 | Ishii et al. | 252/299.01 |
| 4,764,636 | 8/1988 | Sasaki et al. | 544/335 |
| 4,780,240 | 10/1988 | Emoto et al. | 252/299.01 |

FOREIGN PATENT DOCUMENTS

| | | | |
|---|---|---|---|
| 234892 | 9/1987 | European Pat. Off. | 350/341 |
| 259822 | 3/1988 | European Pat. Off. | 250/341 |
| 260450 | 3/1988 | European Pat. Off. | 350/341 |
| 62-231943 | 10/1987 | Japan | 350/341 |
| 6392689 | 4/1988 | Japan | 252/299.01 |

OTHER PUBLICATIONS

Saito, S., et al., Mol. Cryst. Liq. Cryst., vol. 139 (1-2), pp. 171-187 (1986).
Leenhouts, F., et al., J. Appl. Phys., vol. 60 (9), pp. 3275-3281 (11/1/86).
Scheffer, T. J., et al., J. Appl. Phys., vol. 58 (8), pp. 3022-3031 (1985).

*Primary Examiner*—Teddy S. Gron
*Attorney, Agent, or Firm*—Birch, Stewart, Kolasch & Birch

[57] ABSTRACT

A liquid-crystal display device of the twisted nematic type which comprises (1) a pair of electrode substrates facing each other, each being provided with an orientation membrane, the surface of which is treated by rubbing, and (2) a specific nematic liquid-crystal composition having a positive dielectric anisotropy containing a pyrimidine derivative of formula (I),

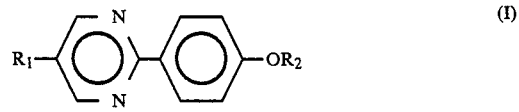

(I)

wherein $R_1$ and $R_2$ are each a straight-chain alkyl group of 1 to 12 carbon atoms and containing an optically active substance, sandwiched between the two electrode substrates and arranged so that the axes of the liquid-crystal molecules will be twisted by an angle $\phi$ in the range of $210° \leq \phi \leq 300°$, which shows excellent multiplex driving characteristics and suitable for use in display units of heavy-duty multiplex driving type.

8 Claims, 4 Drawing Sheets

LIQUID-CRYSTAL DISPLAY DEVICES OF TWISTED NEMATIC TYPE

BACKGROUND OF THE INVENTION

1. Field of the Invention

This invention relates to a liquid-crystal display device of twisted nematic (TN) type with improved multiplex driving characteristics.

2. Description of the Related Art

A conventional TN-type liquid-crystal display device is shown e.g., by FIG. 6. In this figure, the nematic liquid-crystals sandwiched between the two electrode substrates (a and b) having the transparent electrodes (c and d) thereon, are oriented into the twisted helical structure by the orientation membranes (e and f) being made of an insulating material and treated by the so-called rubbing method in which the membrane surfaces to be kept in contact with the liquid crystals are each rubbed unidirectionally. If the two electrode substrates, a and b, are faced each other so that the orientation direction of the membranes will be perpendicular to each other as shown in FIG. 7 and nematic liquid-crystals having a positive dielectric anisotropy ($N_p$) are sandwiched between the two electrodes, then the liquid-crystal molecules will take a helical structure twisted 90°. In FIG. 7, j is the rubbing direction on the upper membrane e, while k is the rubbing direction on the lower membrane f. On the surfaces of the liquid-crystal cell thus constructed, are provided polarizing plates, h and i, so that the polarization axis 1 on plate h and the polarization axis m on plate i are conformable to the orientation directions of membranes e and f, respectively (refer to FIG. 7).

When a matrix-type liquid-crystal display device comprising a number of transparent electrodes is driven by the optimum voltage equalization method, the ratio of the effective voltage at turned-on picture elements $V_{rms}(ON)$ to that at turned-off picture elements $V_{rms}(OFF)$ is represented by the following equation:

$$\alpha = \frac{V_{rms}(ON)}{V_{rms}(OFF)} = \sqrt{\frac{\sqrt{N}+1}{\sqrt{N}-1}}$$

If $N \to \infty$, then $\alpha \to 1$; that is, the difference between $V_{rms}(ON)$ and $V_{rms}(OFF)$ decreases with increasing N. This indicates that liquid crystal materials having sharper response at threshold voltage and orientation membranes having improved properties are required for the development of matrix-type, liquid-crystal display devices with a large amount of information to be displayed which show a high contrast ratio even with a small difference between $V_{rms}(ON)$ and $V_{rms}(OFF)$. In recent years, there has been an increasing demand for a larger amount of information to be displayed. However, conventional TN-type liquid-crystal display devices as described above can hardly respond to the increase in N.

An attempt has been made to improve the multiplex driving characteristics by setting the twist angle of liquid crystal molecules at a level higher than 90°. This may be effected by adding, to nematic liquid crystals, a larger amount of an optical active substance that induces twisted helical structure. The amount of said optical active substance to be added should preferably be such that the ratio of helical pitch of liquid crystal molecules (p) to the thickness of liquid-crystal layer (d) will satisfy $d/p \cong \phi/360°$, and is usually set to satisfy $(\phi/360° - \frac{1}{4}) < d/p < (\phi/360° + \frac{1}{4})$.

However, such liquid-crystal display devices containing a larger amount of optical active substance have the problem that the liquid crystal molecules tend to become disoriented upon voltage application to form domains, resulting in scattering of light and lowering of the contrast ratio. To avoid this disadvantage, it has been attempted to form the orientation membrane of $SiO_2$ by the oblique deposition method, thereby ensuring a larger inclination of the liquid crystal molecules being in contact with the membranes, that is, a larger pretilt angle. With the oblique deposition method, however, it is not easy to form a uniform orientation membrane over a wide area, and hence manufacture of liquid-crystal display devices of larger areas is very difficult. In addition, it is difficult to simultaneously perform uniform orientation operations on a larger number of electrode substrates, making mass-production impracticable.

In this connection, we formerly found that domain formation can be diminished within the range of $\phi \leq 300°$, if a $N_p$-type nematic liquid crystal having a large positive dielectric anisotropy is selected from compounds of biphenyl, pyrimidine, dioxane and ester types and if the helical pitch of liquid crystal molecules (p) and the thickness of liquid-crystal layer (d) are set so that the following relationship will be satisfied (Japanese Unexamined Patent Pub. Nos. 50812/1987 and 194224/1987):

$$(\phi/360° - \tfrac{1}{4}) < d/p < (\phi/360° + \tfrac{1}{4})$$

In this case, another problem arises from the large refractive index anisotropy ($\Delta n$: 0.20 to 0.25) of the above $N_p$-type nematic liquid crystals. Since the value of $\Delta n \cdot d$ should preferably be set in the range of $0.5\ \mu m \leq \Delta n \cdot d \leq 1.1\ \mu m$ in the viewpoint of image quality of display devices, the thickness of liquid-crystal layer (d) should be set at a level of 5.5 $\mu m$ or less. In such thin cells, however, conductive impurities unavoidably involved therein tend to cause a conductive state across the two electrodes, thus adversely affecting correct display, and increasing the thickness of liquid-crystal layer to avoid this trouble leads to degraded image quality.

Further studies to overcome these difficulties have led us to find that liquid-crystal display devices of high image quality free from domain formation up to an angle ($\phi$ about 300°) can be obtained, if an $N_p$-type liquid-crystal composition comprising a specific pyrimidine derivative with a low positive dielectric anisotropy is used and if the helical pitch of liquid crystal molecules (p) and the thickness of liquid-crystal layer (d) are set as described above.

SUMMARY OF THE INVENTION

This invention relates to a liquid-crystal display device of the twisted nematic type which comprises (1) a pair of electrode substrates facing each other, each being provided with an orientation membrane the surface of which is treated by rubbing, and (2) a nematic liquid-crystal composition having a positive dielectric anisotropy and containing an optically active substance, sandwiched between the two electrode substrates and arranged so that the axes of the liquid-crystal molecules will be twisted by a prescribed angle $\phi$, said nematic liquid-crystal composition comprising at least 5 weight % of liquid-crystals of a pyrimidine derivative represented by the following formula (I),

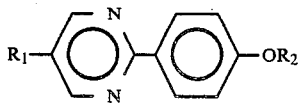

(wherein $R_1$ and $R_2$ are each a straight-chain alkyl group of 1 to 12 carbon atoms), and said angle $\phi$ being set at a level in the range of $210° \leq \phi \leq 300°$ under the condition of $(\phi/360° - \frac{1}{4}) < d/p < \phi/360°$.

Thus this invention makes it possible to provide liquid-crystal display devices of super-twisted type easily and consistently by the use of rubbing treatment. The display devices of this invention show excellent multiplex driving characteristics and are suitable for use in display units of heavy-duty multiplex driving type.

In addition, the liquid-crystal display devices of this invention can be mass-produced with a high efficiency because orientation can be effected by a simple operation (rubbing).

DETAILED DESCRIPTION OF THE PREFERRED EMBODIMENT

Figure 1:
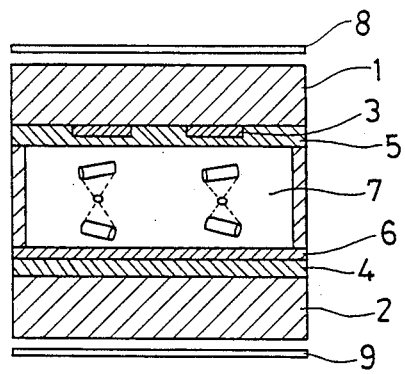
FIG. 1 is a schematic sectional view of a liquidcrystal display device of twisted nematic type of this invention.

The liquid-crystal composition of this invention is of $N_p$ nematic liquid crystal type containing at least 5 weight % of liquid crystals of a pyrimidine derivative (I) and also containing a suitable amount of an optically active substance to achieve a specific helical pitch (p) as shown above. The combination of the pyrimidine derivative (I), nematic liquid-crystals having a large positive dielectric anisotropy and an optically active substance is preferable because of the lowered voltage required for multiplex driving. The nematic liquid crystals having a large positive dielectric anisotropy are preferred to be at least one cyano compound represented by the following formulae because of the small change in image quality with the passage of time, high durability when placed in service over long periods under severe conditions (e.g., in outdoor use), and lack of adverse effect upon the prevention of domain formation:

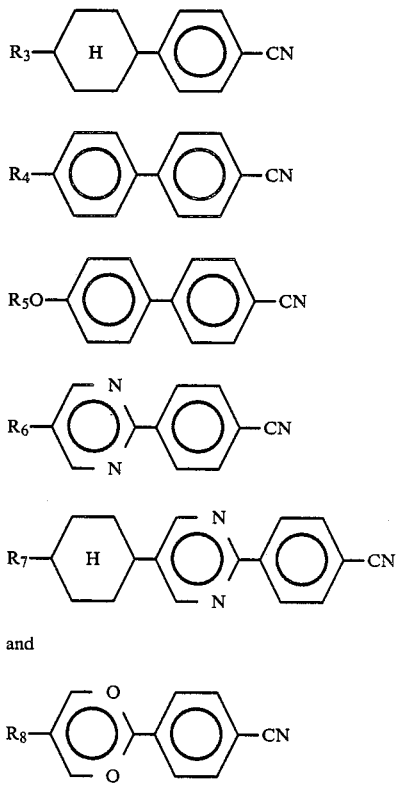

and

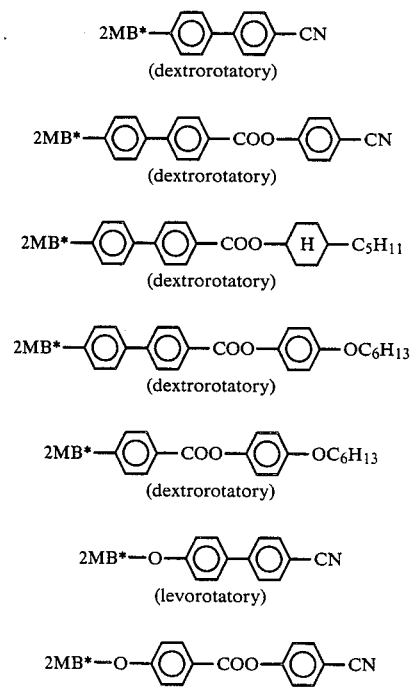

(wherein $R_3$ to $R_8$ are each a straight-chain alkyl group of 1 to 7 carbon atoms). The amount of the nematic liquid crystals is suitably 20-50 weight % of the liquid crystal composition.

The optically active substance is suitably chiral nematic liquid crystals represented by following formulae,

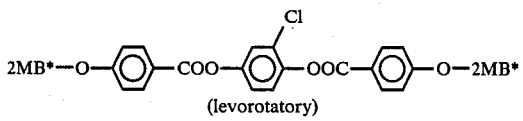
(levorotatory)

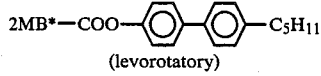
(levorotatory)

(wherein 2MB* denotes a radical of $C_2H_5$—C*H(CH$_3$)—CH$_2$— in which C* stands for an asymmetric carbon atom) or cholesteric liquid crystals having a cholesterol ring and represented by the following formula,

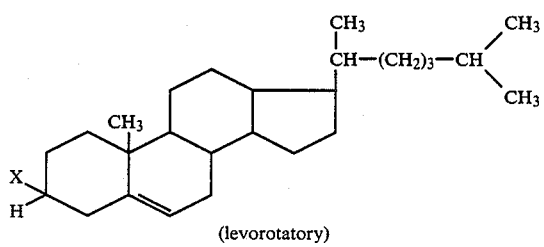
(levorotatory)

(wherein X is —Cl, —OCOC$_8$H$_{17}$ or

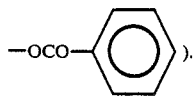 ).

The amount of the optically active substance is suitably 0.1–5 weight % of the liquid-crystal composition.

If the amount of the pyrimidine derivative (I) in the N$_p$-type nematic liquid-crystal composition is less than 5 weight %, its effect to prevent domain formation is insufficient. The amount should preferably be in the range from 10 to 70 weight %, most preferably in the range from 30 to 70 weight %.

The aforementioned N$_p$-type nematic liquid-crystal composition may also contain other types of liquid crystals so long as the effect of the pyrimidine derivative is not inhibited. These include compounds represented by the following formulae,

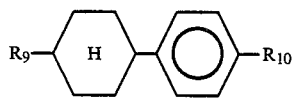

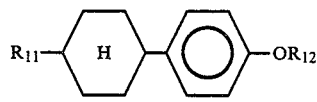

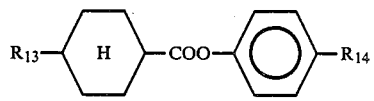

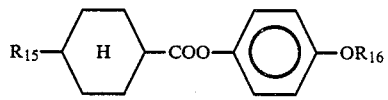

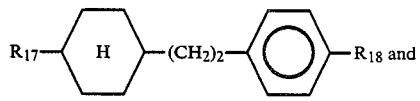 and

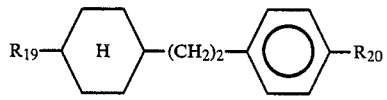

(wherein R$_9$ through R$_{20}$ are each a straight-chain alkyl group of 1 to 7 carbon atoms), and compounds represented by the following formulae,

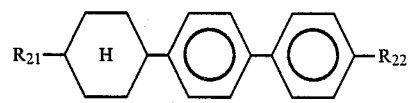

(wherein R$_{21}$ through R$_{24}$ are each a straight-chain alkyl group of 1 to 7 carbon atoms). The addition of at least one of these compounds is preferable in practical application, because this helps broaden operation temperature range and improves response characteristics without adversely affecting the prevention of domain formation and without causing degradation of image quality with the passage of time.

As the orientation membrane of this invention, inorganic materials may be used, such as SiO$_2$ and SiO, and organic materials such as polyimides as shown below which can be prepared by dehydrative ring-closure of polyamic acid,

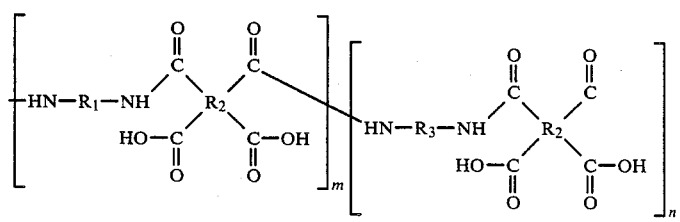

-continued

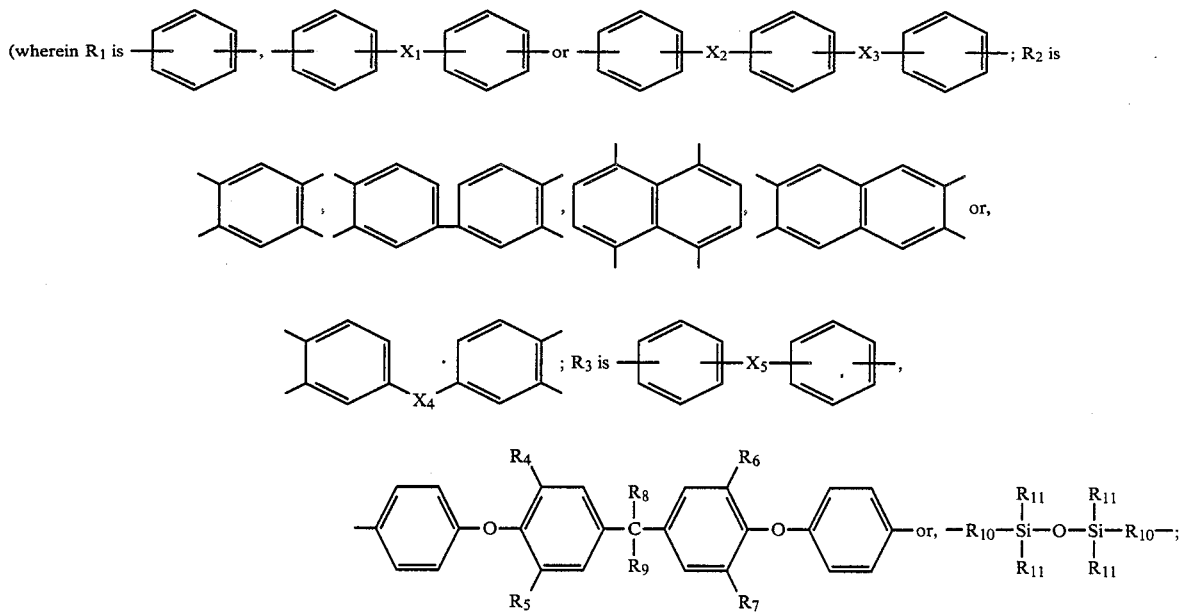

(wherein $R_1$ is ...; $R_2$ is ..., ..., ..., ..., or, ...; $R_3$ is ...,

..., ; $R_4$, $R_5$, $R_6$, $R_7$, $R_8$, $R_9$ ... or, $-R_{10}-\underset{\underset{R_{11}}{|}}{\overset{\overset{R_{11}}{|}}{Si}}-O-\underset{\underset{R_{11}}{|}}{\overset{\overset{R_{11}}{|}}{Si}}-R_{10}-$;

$X_1$ to $X_5$ are each $-(CH_2)_n-$, $-O-(CH_2CH_2O)_n-$, $-O-$, $-S-$ or $SO_2$; $R_4$ to $R_7$ are each hydrogen or a lower alkyl; $R_8$ and $R_9$ are each hydrogen, methyl, ethyl or trifluoromethyl; $R_{10}$ is a bivalent hydrocarbyl group; and $R_{11}$ is a monovalent hydrocarbyl group).

Of the compounds mentioned above, the organic materials generally show broader d/p region than the inorganic materials (e.g., $SiO_2$). Particularly, membranes made of a polymer of polyimide-silane series, prepared by the reaction of 1,3-bis(aminopropyl)-tetramethyldisiloxane, 4,4'-diaminodiphenyl ether and 3,3',4,4'-benzophenone-tetracarboxylic acid anhydride, are the most preferred because of the broadest d/p region.

In the liquid-crystal display device of this invention, a $N_p$-type nematic liquid-crystal composition containing at least 5 weight % of a pyrimidine derivative of formula (I) is sandwiched in a special twisted state—at an unnatural twist angle $\phi$ compared with the corresponding smaller angle $\phi$. Therefore, any domain formation is inhibited or prevented over the range of 210° to 300° and a thickness of liquid-crystal layer sufficient for ensuring high image quality can be secured.

This invention will become more apparent from the following explanation of examples with reference to the accompanying drawings.

(EXAMPLE 1)

FIG. 1 is a schematic sectional view of a liquidcrystal device of this invention. Transparent electrodes made of induim oxide, 3 and 4, were formed on the back surface of upper glass substrate 1 and on the upper surface of lower glass substrate 2, orientation membranes made of a polyimide-silane, 5 and 6, were provided on each surface of the electrodes, and their surfaces were rubbed with a cloth in a specified direction, thus making a liquid-crystal cell. 7 in the figure is the layer of liquid crystal composition, 8 is upper polarizing plate, and 9 is lower polarizing plate.

Orientation membranes 5 and 6 were formed by spinnercoating of 30 weight % N-methylpyrrolidone solution of a polyamidic acid, prepared by condensation of 0.1 mole 1,3-bis(aminopropyl)tetramethyldisiloxane, 0.9 mole 4,4'-diaminodiphenyl ether and 1.0 mole 3,3'4,4'-benzophenonetetracarboxylic acid anhydride, followed by heating at 350° C. for one hour to complete the ring closure.

Figure 2:
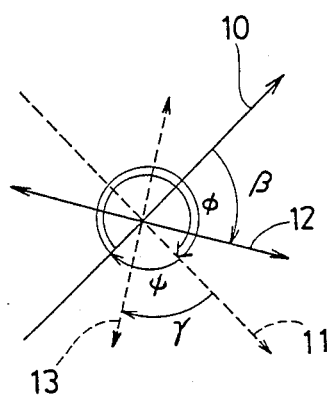
FIG. 2 illustrates the rubbing angle, the twist angle of liquid-crystal molecules and the poloarization axes of polarizing plates in liquid-crystal display device of this invention.

FIG. 2 illustrates the relationship between rubbing angle and twist angle of liquid crystal molecules in the above liquid-crystal display device. $\psi$ is the angle between the rubbing direction 10 on upper glass substrate 1 and the rubbing direction 11 on lower glass substrate 2, and $\phi$ is the twist angle of liquid crystal molecules, in which the relationship $\psi=360°-\phi$ holds.

In this device, were sealed various $N_p$-type nematic liquid crystal compositions having relatively low $\Delta n$ (refractive index) values, with the twist angle $\phi$ set in the range of 210° to 300° and the d/p ratio varied by addition of CB-15 Merk Co.; 4-(2-methylbutyl)-4'-cyanobiphenyl) as optical active substance (1 to 2 weight %) and the d/p regions with no domain formation was examined.

Figure 4:
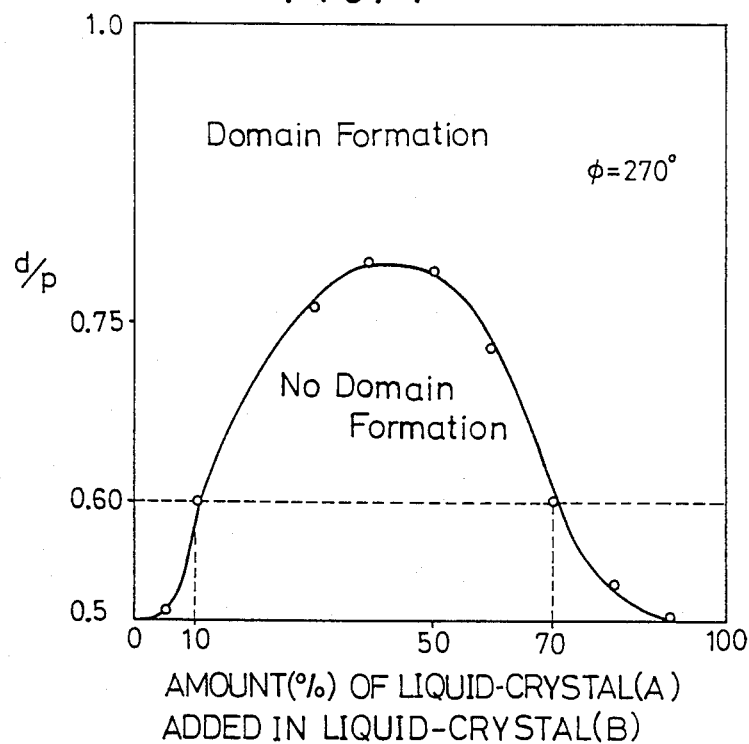
FIG. 4 is the relationship between d/p and the amount of nematic liquid crystals added showing the region in which no domain is formed.

It was demonstrated that nematic liquid crystals of 2-(4-alkoxyphenyl)-5-alkylpyrimidine type having the following composition show a value of $\Delta n$ of 0.15 and have the d/p region with no domain formation up to 300° as shown in FIG. 4 and Table 1:

A. 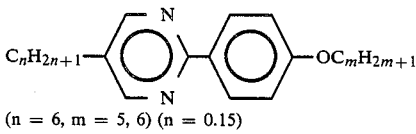 50 weight %

(n = 6, m = 5, 6) (n = 0.15)

B. Liquid crystals of cyanocyclohexane type (PCH) 50 weight %

TABLE 1

| Liq. crystal | φ | | | | |
|---|---|---|---|---|---|
| | 210° | 240° | 270° | 300° | >300° |
| A + B | 0.33 < d/p < 0.68 | 0.42 < d/p < 0.72 | 0.50 < d/p < 0.79 | 0.58 < d/p < 0.85 | — |

As is apparent from Table 1, no domain was formed if the d/p ratio was set so as to meet the condition of $(\phi/360° - \frac{1}{4}) < d/p < \phi/360°$ within the range of $\phi \leq 300°$. The liquid crystals (B) of cyanocyclohexane type (PCH) with a positive dielectric anisotropy used in this example has no d/p region in which domain is not formed. This indicates that the result shown in Table 1 (no formation of domain) is due to the effect of the nematic liquid crystals of 2-(4-alkoxyphenyl)-5-alkyl-pyrimidine type. Further, it was also confirmed that a twist angle φ in the range from 210° to 300° was suitable for the device to show a good multiplex driving characteristics.

Figure 3:
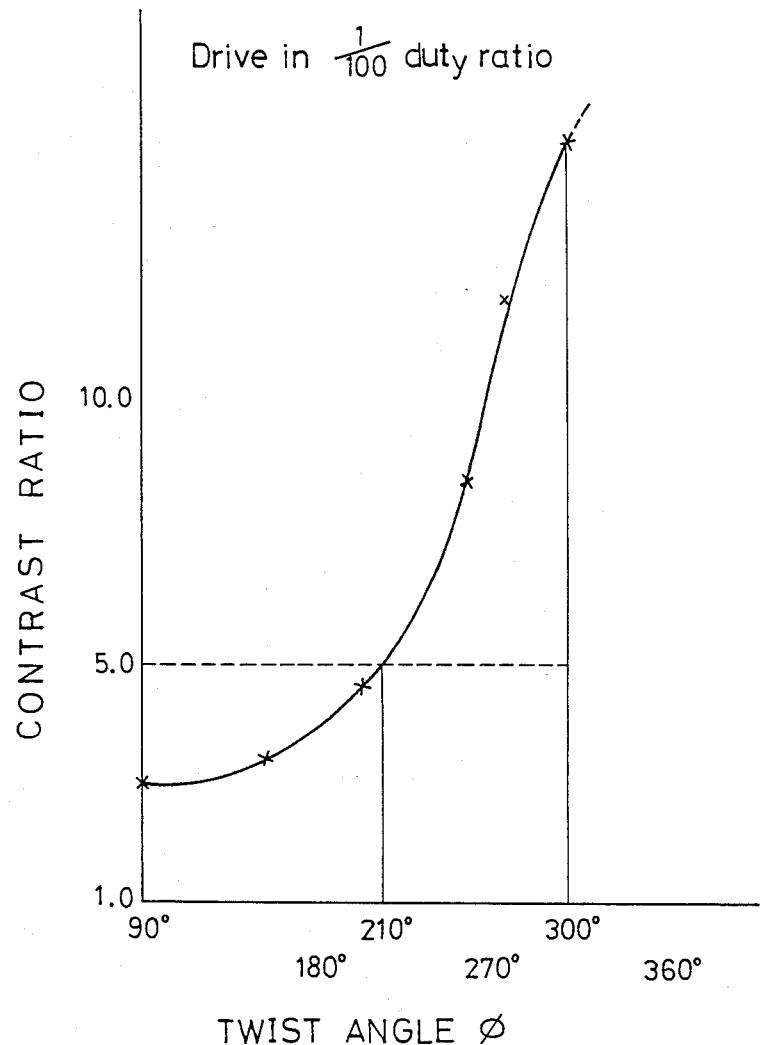
FIG. 3 is a graph showing the dependency of contrast ratio upon twist angle $\phi$.

It was also demonstrated that the findings obtained above are common to all the compounds represented by the formula (I). FIG. 3 shows the relationship between twist angle φ and contrast ratio with liquid crystals (A) in which n=5, 6 and m=4, 5. Higher contrast ratio is shown in the range from 210° to 300°, especially from 270° to 300°. (Example 2)

A liquid crystal device of the same structure as shown in FIG. 1 as sued in this example. The rubbing angle ψ was 90°, the twist angle of liquid crystal φ was 270°, the thickness (d) of liquid-crystal layer 4 was 6.5 μm, and the aforementioned polyimide-silane was used for orientation membranes 5 and 6. The composition of nematic liquid crystals used is shown in Table 2.

This nematic liquid crystals also contain 1.46 weight % of CB-15 (dextrorotatory) as optical active substance so as to control the twist angle φ to 270°. Since the helical pitch p is then 10.0 μm, the value of d/p ratio is about 0.65 —a level within the aforementioned range, $(\phi/360° - \frac{1}{4}) < d/p < \phi/360°$. The value of Δn.d is 0.85 μm because the refractive index anisotropy Δn of the nematic liquid crystal shown in Table 2 is 0.13.

In addition, the value of Δn.d is preferably in the range of 0.5 μm ≦ Δn.d ≦ 1.1 μm from the viewpoints of coloration on display surface when no voltage is applied. The polarizing plates are also preferably set at angles of B=70° and Y=20° (B is the angle between the polarization axis 12 of upper polarizing plate 8 and the rubbing direction 10 of upper glass substrate 1 in FIG. 2, and Y is the angle between the polarization axis 13 of lower polarizing plate 9 and the rubbing direction 11 of lower glass substrate 2). From the viewpoints of multiplex driving characteristics and coloration on display surface when no voltage is applied, these angles are desirably set so as to satisfy the following conditions, $\beta + \gamma = 90°$, $60° < \beta < 80°$ and $10° < \gamma < 30°$ for positive display, and to satisfy the following conditions, $\beta + \gamma = 180°$, $60° < \beta < 80°$ and $100° < \gamma < 120°$ for negative display.

The liquid-crystal display device constructed as described above proved to have excellent display characteristics with no domain formation and to be also satisfactory in reliability.

Figure 5:
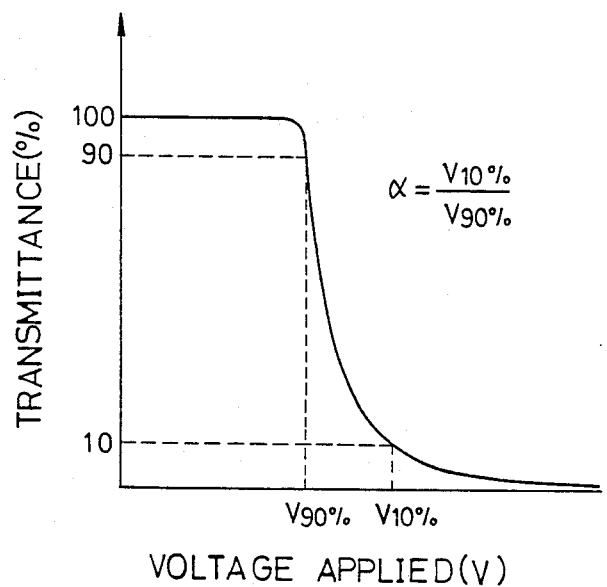
FIG. 5 is a voltage versus transmittance characteristic curve to explain multiplex driving characteristics.
Figure 6:
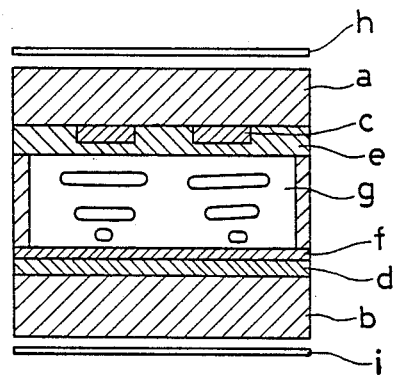
FIG. 6 is a schematic sectional view of a conventional TN-type liquid-crystal display device.
Figure 7:
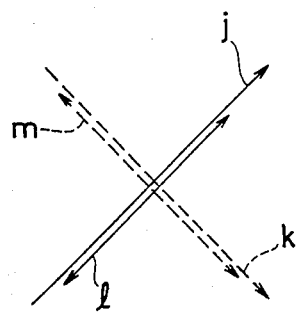
FIG. 7 illustrates the rubbing angle and the polarization axes of polarizing plates in a conventional TN-type liquidcrystal display device.

FIG. 5 shows a typical voltage-transmittance characteristic

TABLE 2

| Compound | Composition (wt. %) |
|---|---|
| 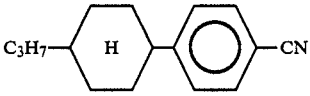 | 10.0 |
| 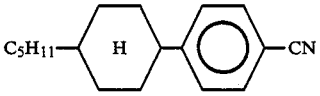 | 12.5 |
| 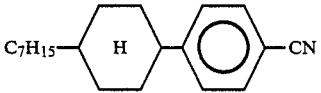 | 10.0 |
| 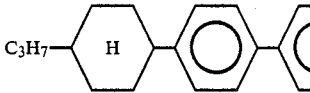 | 5.0 |
| 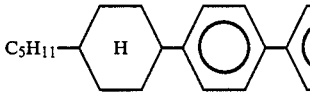 | 5.0 |
| 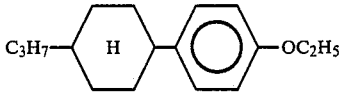 | 7.5 |
| 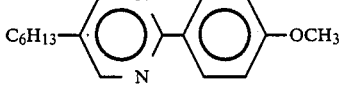 | 12.5 |
| 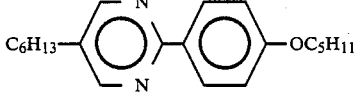 | 12.5 |
| 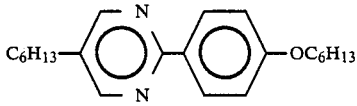 | 12.5 |
| 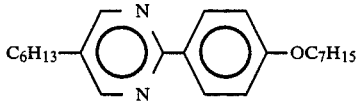 | 12.5 | curve of a TN-type liquid-crystal display device including the one prepared in this Example. The value defined by the following equation, $$a = V_{10\%} / V_{90\%}$$

(wherein $V_{10\%}$ and $V_{90\%}$ are voltages corresponding to 10% and 90% transmittance, respectively) is a measure for the steepness of the voltage-transmittance characteristic curve; multiplex driving characteristics become better as the value of a comes close to 1. This value was 1.08 for the display device of this invention, and 1.50 for a conventional TN type display device using the nematic liquid crystals of the same composition as shown in Table 2.

As is apparent from the foregoing, the liquid-crystal display device of this invention have markedly improved multiplex driving characteristics and also show a higher contrast ratio over a broader visual angle range.

It is demonstrated that use of the nematic liquidcrystal composition shown in Table 3 is also effective as in Examples 1 and 2.

TABLE 3

| Compound | Composition (wt. %) |
|---|---|
| 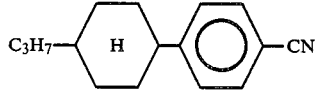 | 3.0 |
| 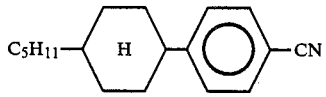 | 3.0 |
| 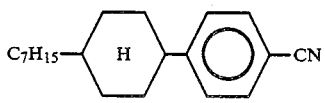 | 4.0 |
| 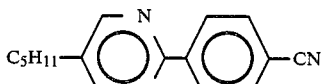 | 18.5 |
| 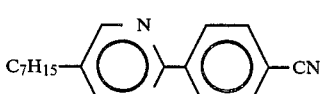 | 18.5 |
| 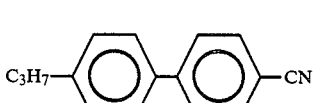 | 3.0 |
| 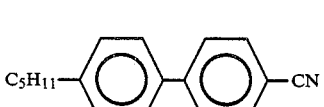 | 12.0 |
|  | 3.0 |
| 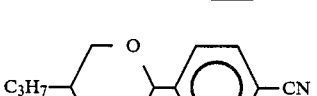 | 5.0 |
| 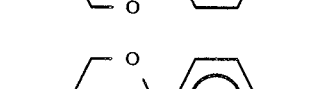 | 5.0 |
| 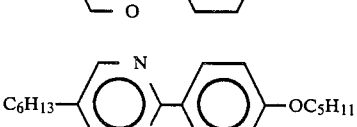 | 5.0 |

TABLE 3-continued

| Compound | Composition (wt. %) |
|---|---|
| 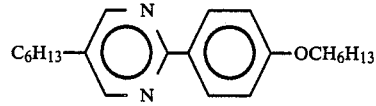 | 5.0 |
| 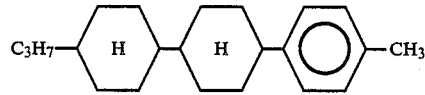 | 6.0 |
|  | 6.0 |
| 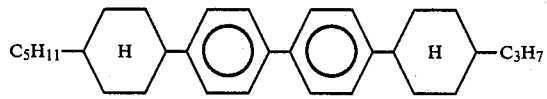 | 3.0 |

What we claim is:

1. A liquid-crystal display device of the twisted nematic type which comprises (1) a pair of electrode substrates facing each other, each being provided with an orientation membrane, the surface of which is treated by rubbing, and (2) a nematic liquid-crystal composition having a positive dielectric anisotropy and containing an optically active substance, sandwiched between the two electrode substrates and arranged so that the axes of the liquid-crystal molecules will be twisted by a prescribed angle $\phi$, said nematic liquid-crystal composition comprising at least 5 weight % of liquid-crystals of a pyrimidine derivative represented by the following formula (I),

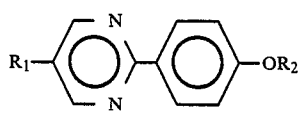   (I)

wherein $R_1$ and $R_2$ are each a straight-chain alkyl group of 1 to 12 carbon atoms, and said angle $\phi$ being set at a level in the range of $210° \leq \phi \leq 300°$ under the condition of $(\phi/360° - 1.4) < d/p < \phi/360°$, in which p represents the helical pitch of liquid-crystal molecules and d represents the thickness of liquid-crystal layer.

2. The display device of claim 1 in which the nematic liquid-crystal composition comprises the liquid-crystal of pyrimidine derivative (I), nematic liquid-crystals having large positive dielectric anisotropy and an optically active substance.

3. The display device of claim 2 in which the nematic liquid-crystal having large positive dielectric anisotropy includes a cyano compound selected from the group consisting of compounds of the formula:

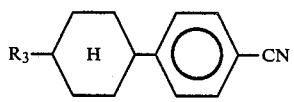

-continued

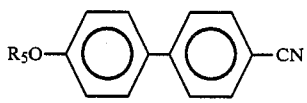

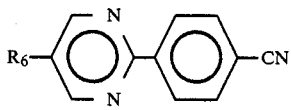

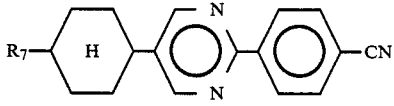

and

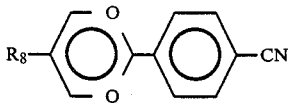

wherein $R_3$ to $R_8$ are each a straight-chain alkyl group of 1 to 7 carbon atoms.

4. The display device of claim 2 in which the optically active substance includes at least one compound selected from the group consisting of compounds of the formulae:

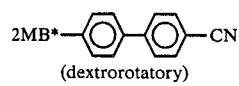
(dextrorotatory)

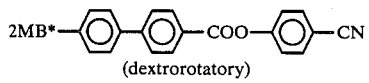
(dextrorotatory)

-continued

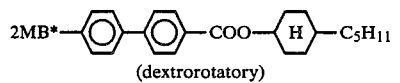
(dextrorotatory)

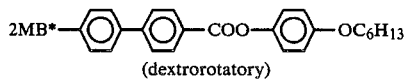
(dextrorotatory)

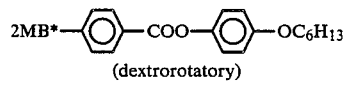
(dextrorotatory)

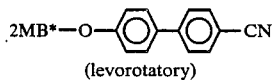
(levorotatory)

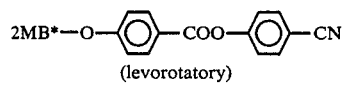
(levorotatory)

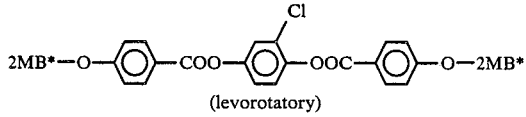
(levorotatory)

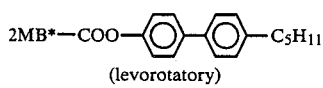
(levorotatory)

wherein 2MB* denotes a radical of $C_2H_5$-$C^*H(CH_3)$-$CH_2$— in which C* stands for an asymmetric carbon atom, and a compound of those represented by the formula:

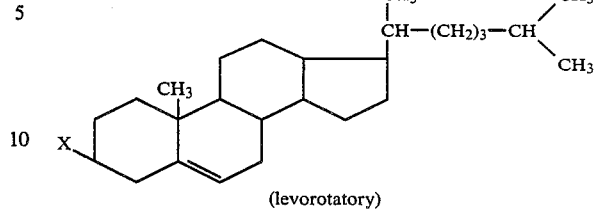
(levorotatory)

wherein X is —Cl, —$OCOC_7H_{17}$ or

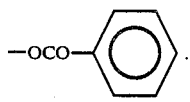.

5. The display device of claim 1 in which the formula (I) pyrimidine derivative is contained in an amount of 10 to 70 weight % in the nematic liquid-crystal composition.

6. The display device of claim 5 in which the amount of the formula (I) pyrimidine derivative is 30 to 70 weight %.

7. The display device of claim 1 in which the orientation membrane is made of an inorganic or organic material.

8. The display device of claim 7 in which the inorganic material is $SiO_2$ and the organic material is a polyimide.

* * * * *